(12) United States Patent
Peight

(10) Patent No.: US 12,318,852 B2
(45) Date of Patent: Jun. 3, 2025

(54) FLATTENING AND RESURFACING MILL

(71) Applicant: Japheth Peight, Mcveytown, PA (US)

(72) Inventor: Japheth Peight, Mcveytown, PA (US)

( * ) Notice: Subject to any disclaimer, the term of this patent is extended or adjusted under 35 U.S.C. 154(b) by 262 days.

(21) Appl. No.: 17/698,610

(22) Filed: Mar. 18, 2022

(65) Prior Publication Data

US 2022/0297208 A1      Sep. 22, 2022

Related U.S. Application Data

(60) Provisional application No. 63/163,288, filed on Mar. 19, 2021.

(51) Int. Cl.
| | |
|---|---|
| B23D 45/02 | (2006.01) |
| B23D 47/12 | (2006.01) |
| B27B 5/02 | (2006.01) |
| B27B 5/29 | (2006.01) |
| B27C 1/00 | (2006.01) |
| B27B 5/18 | (2006.01) |

(52) U.S. Cl.
CPC .......... *B23D 45/024* (2013.01); *B23D 47/12* (2013.01); *B27B 5/02* (2013.01); *B27B 5/29* (2013.01); *B27C 1/00* (2013.01); *B27C 1/005* (2013.01); *B27B 5/187* (2013.01)

(58) Field of Classification Search
CPC .. B27B 5/02; B27B 5/187; B27B 5/29; B27B 5/04; B27B 5/06; B27B 5/063; B27B 5/065; B27B 5/18; B27C 1/00; B27C 1/005; B27C 1/02; B27C 1/04; B27C 1/14; B27C 9/02; B23D 1/003; B23D 1/006; B23D 1/08; B23D 1/10; B23D 1/20; B23D 1/28; B23D 45/024; B23D 47/12

See application file for complete search history.

(56) References Cited

U.S. PATENT DOCUMENTS

| | | | |
|---|---|---|---|
| 864,257 A | * 8/1907 | Porter | B27C 1/005 144/119.1 |
| 6,916,141 B2 | 7/2005 | Owen | |
| 7,000,658 B1 | * 2/2006 | Soukiassian | B27C 9/02 144/286.5 |

(Continued)

FOREIGN PATENT DOCUMENTS

| | | | |
|---|---|---|---|
| AU | 2006201904 B2 | | 11/2006 |
| CN | 112372765 A | * | 2/2021 |
| DE | 3621240 A1 | * | 1/1988 |

OTHER PUBLICATIONS

Wood-Mizer, "Wood Slab Flattening Mill for Wide Slabs, Burls, and Boards," https://woodmizer.com/us/slabmizer-mb200-slab-flattener, 2021, pp. 1-4.

*Primary Examiner* — Jared O Brown
(74) *Attorney, Agent, or Firm* — The Webb Law Firm

(57) ABSTRACT

A powered cutting apparatus for cutting an elongated work piece, the cutting apparatus including: a base having a top surface fixed to a bottom section; at least one attachment guide removably fixed to the top surface for connecting to a guide rail; a motor fixed to the base at the top surface; the motor includes a shaft which extends past an edge of the top surface; a cutterhead coupled to the motor with a first band and fixed to the bottom section of the base; and the cutterhead cuts an even plane surface of a cutting surface based on the rotational output of the motor.

17 Claims, 16 Drawing Sheets

(56) References Cited

U.S. PATENT DOCUMENTS

| | | | |
|---|---|---|---|
| 7,458,402 B2* | 12/2008 | Wixey | B27C 1/04 144/117.1 |
| 2012/0042989 A1* | 2/2012 | Chuang | B27C 1/04 144/116 |
| 2021/0023736 A1* | 1/2021 | Wollenburg | B27C 1/14 |

* cited by examiner

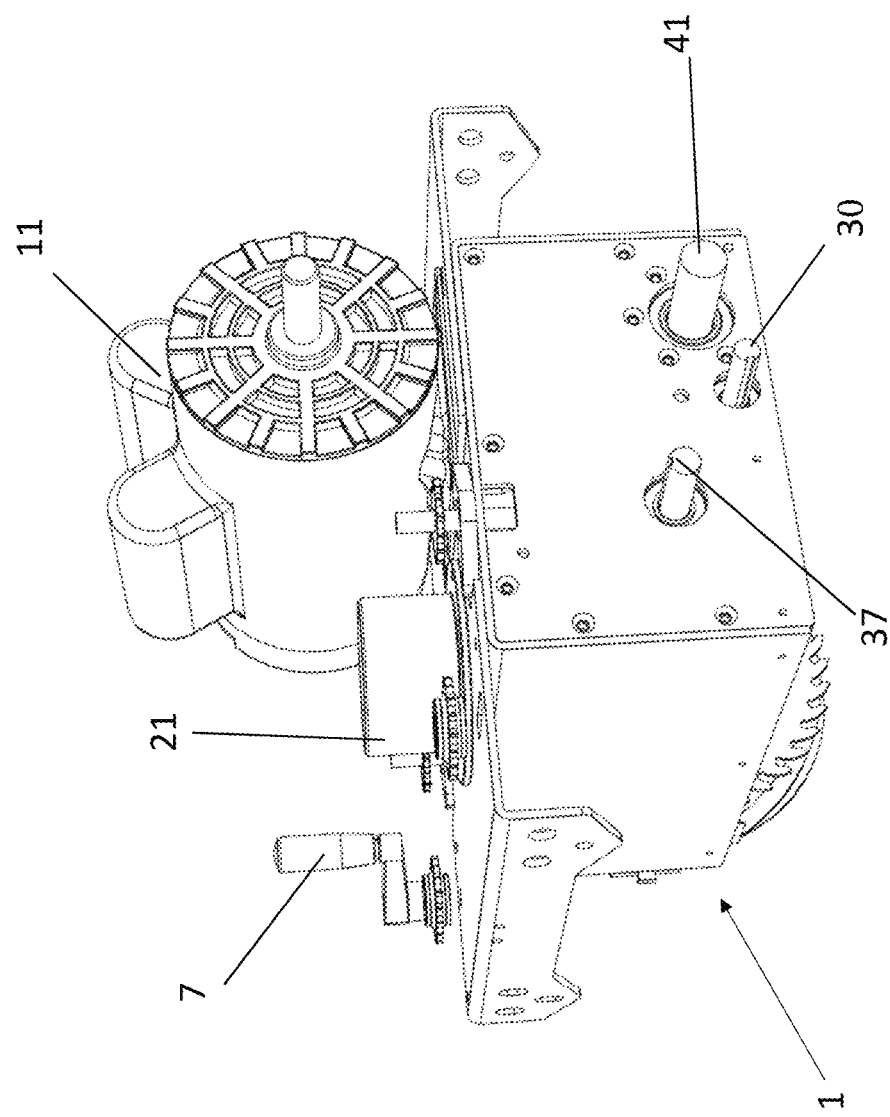

FLATTENING AND RESURFACING MILL

CROSS-REFERENCE TO RELATED APPLICATIONS

This application claims the benefit of U.S. provisional Patent Application No. 63/163,288 filed on Mar. 19, 2021, the disclosure of which are hereby incorporated by reference in their entirety.

BACKGROUND OF THE INVENTION

Field of the Invention

The present disclosure is directed to a cutting device and, more particularly, to a cutting device used to perform cutting actions on one or more work pieces such as, but not exclusively, work pieces in the form of sheet material such as, for example, wooden slabs, burbs, or flitches.

Description of Related Art

There is a current problem in the present industry in the limited access to properly cutting materials accurately and efficiently. With any form of work piece which is required to be fitted or cut to a particular area or shape, there is often a need for different cut styles such as rip cuts and cross cuts, and then additional sanding to refine the cuts performed. Currently, there are several solutions to this problem such as: manually using a saw, but, often the accuracy and quality of cut which can be achieved is unsuitable and can lead the cut material to not fitting correctly; a planer machine, but the efficiency of this method is undesirable; and a router based tracking system, however, this method lacks accuracy by providing an inaccurate cut surface. A further problem is that the current cutting apparatuses or methods produce a cutting surface that is likely damaged, and thus need to be additionally sanded to improve the cutting surface. Finally, the current solution can be tiring for the person and therefore on occasion, they may attempt to perform the cutting acting using other tools which may be unsuitable and dangerous for this particular purpose. Thus, cutting from these styles creates a larger range of error and leads to dissatisfaction in cut work piece turnout. Current devices and methods use a smaller cutting device or have a smaller area of contact between the cutting device and the cutting surface of the work piece. This leads to tracking or grooves from the smaller cutting contact. Thus, sanding and additional refinishing is required. Using the proposed cutting device results in significant cut accuracy because of the increased contact area between the cutting portion of the flattening and resurfacing mill and the work piece. This increases cut accuracy especially for large utility scale projects, an increase in safety for the user, and an increase in efficiency leading to a less tiresome person.

There is a current need in the industry for an improved cutting device and method for cutting with a flattening and resurfacing mill.

SUMMARY OF THE DISCLOSURE

In one aspect, the disclosure provides powered cutting apparatus for cutting an elongated work piece, the cutting apparatus comprising: a base having a top surface being approximately flat and fixed to a bottom section comprising walls configured to withstand rotational force; at least one attachment guide removably fixed to the top surface for connecting to a guide rail; a motor fixed to the base at the top surface; the motor comprises a shaft which extends past an edge of the top surface; a cutterhead coupled to the motor with a first band and fixed to the bottom section of the base; and wherein the cutterhead cuts an even plane surface of a cutting surface based on the rotational output of the motor.

In another aspect, the disclosure provides the powered cutting apparatus for cutting an elongated work piece wherein the cutterhead comprises a cutter shaft coupled to the first band through the bottom section and a cutting tool coupled to the cutter shaft; wherein the top surface creates a plane parallel to the cutter shaft and the cutting tool cuts the elongated workpiece at an angle approximately perpendicular to the plane.

In another aspect, the disclosure provides the powered cutting apparatus for cutting an elongated work piece, further comprising a first adjuster for adjusting the pitch or angle of the top surface of the base relative to the cutting surface, wherein the first adjuster is fixed to the top surface of the base.

In another aspect, the disclosure provides the powered cutting apparatus for cutting an elongated work piece, further comprising a second adjuster for adjusting the pitch or angle of the top surface of the base relative to a cutting surface, wherein the second adjuster is fixed to the top surface of the base.

In another aspect, the disclosure provides the powered cutting apparatus for cutting an elongated work piece, wherein the top surface of the base further comprises at least one rail attachment fixture for attaching the top surface to a rail system.

In another aspect, the disclosure provides the powered cutting apparatus for cutting an elongated work piece, further comprising a first adjuster for adjusting the pitch or angle of the cutterhead relative to the cutting surface, wherein the first adjuster is fixed to the top surface of the base.

In another aspect, the disclosure provides the powered cutting apparatus for cutting an elongated work piece, a sander coupled to the motor with a second band and adjustably fixed to the bottom section of the base; wherein the sander location relative to the cutterhead and a plane of the top surface is adjustable and the attachment guide is adjustably fixable to a guide rail.

In another aspect, the disclosure provides, the powered cutting apparatus for cutting an elongated work piece, wherein the first band is releasably coupled to a shaft of the cutterhead and the second band is releasably coupled to a shaft of the sander so that the output of the motor can rotate the cutterhead and the sander at different rotational speeds.

In another aspect, the disclosure provides a powered cutting apparatus for cutting an elongated work piece, the cutting apparatus comprising: a base having a bottom section and a top surface with drop down attachments configured for releasably coupling to a rail and at least one guide attachment for releasably coupling to a guide rail; a motor fixed to the top surface of the base; a cutterhead coupled to the motor with a first band and rotatably fixed to the bottom section of the base via a shaft, the cutterhead is positioned approximately parallel with the surface of the base; a sander coupled to the motor with a second band and adjustably fixed to the bottom section of the base; wherein the sander location relative to the cutterhead is adjustable and the guide attachment is adjustably fixable to a guide rail; wherein the sander location relative to the cutterhead and set of guide rails is adjustable with an adjuster.

In another aspect, the disclosure provides the powered cutting apparatus for cutting an elongated work piece, further comprising a crank arm rotationally fixed to the top surface configured to laterally adjust the base in reference to the rails.

In another aspect, the disclosure provides the powered cutting apparatus for cutting an elongated work piece, wherein the cutterhead comprises a removable and adjustable shaft coupled to the first band through the bottom container and a cutting tool coupled to the shaft; wherein the cutting surface angle of the cutting tool is parallel to the shaft and adjustable based on the adjustability of the shaft.

In another aspect, the disclosure provides the powered cutting apparatus for cutting an elongated work piece, further comprising a first adjuster and second adjuster for adjusting the pitch or angle of the base relative to the cutting surface, wherein the first adjuster is adjustably fixed to the base.

In another aspect, the disclosure provides the powered cutting apparatus for cutting an elongated work piece, further comprising a second adjuster for adjusting the pitch or angle of the base relative to a cutting surface, wherein the second adjuster is adjustably fixed to the base.

In another aspect, the disclosure provides the powered cutting apparatus for cutting an elongated work piece, wherein the drop down attachments further comprise at least one fixture means which allow for adjustably attaching the top surface to at least one rail.

In another aspect, the disclosure provides the powered cutting apparatus for cutting an elongated work piece, wherein the sander coupled to the motor with the second band and adjustably fixed to the bottom container of the base; wherein the sander location relative to the cutterhead is adjustable.

In another aspect, the disclosure provides the powered cutting apparatus for cutting an elongated work piece, wherein the first band is releasably coupled to the cutterhead and motor and the second band is releasably coupled to the motor so that the output of the motor can rotate the cutterhead and the sander at different rotational speeds.

In another aspect, the disclosure provides the powered cutting apparatus for cutting an elongated work piece, further comprising a blade attachment removably and rotationally fixed to the bottom section of the base with a blade shaft; wherein the blade attachment is configured to cut the elongated work piece at a cutting surface angle parallel to the shaft and adjustable based on the adjustability of the blade shaft.

In another aspect, the disclosure provides a method of cutting an elongated workpiece with a powered cutting apparatus comprising: releasably attaching the cutting apparatus to a rail system; releasably attaching an elongated workpiece to the rail system; adjusting the elongated workpiece to be flush or level along a plane of the rail system; adjusting a cutterhead of the powered cutting apparatus to cut along the plane of the elongated workpiece; cutting the elongated workpiece using the cutterhead by having the cutterhead cut downward towards the plane; and moving the apparatus to cut at least a part of the elongated cutting surface.

In another aspect, the disclosure provides a method of cutting an elongated workpiece with a powered cutting apparatus further comprising adjusting a sander of the powered cutting apparatus to sand along the plane of the elongated workpiece.

In another aspect, the disclosure provides a method of cutting an elongated workpiece with a powered cutting apparatus comprising sanding the elongated workpiece using the sander along the plane of the elongated workpiece; and rotating the cutterhead and the sander at different rotational speeds wherein a first band is releasably coupled to the cutterhead and a motor and a second band is releasably coupled to the motor so that the output of the motor can rotate the cutterhead and the sander at different rotational speeds.

BRIEF DESCRIPTION OF THE DRAWING

FIG. 16 is drive side view of the flattening and resurfacing mill with the saw blade attachment including a saw blade drive shaft.

DESCRIPTION OF THE DISCLOSURE

For purposes of the description hereinafter, spatial orientation terms, as used, shall relate to the referenced aspect as it is oriented in the accompanying drawings, figures, or otherwise described in the following detailed description. However, it is to be understood that the aspects described hereinafter may assume many alternative variations and configurations. It is also to be understood that the specific components, devices, features, and operational sequences illustrated in the accompanying drawings, figures, or otherwise described herein are simply exemplary and should not be considered as limiting.

As shown in FIGS. 1-16, the present disclosure is directed to a flattening and resurfacing mill 100 that is not limited to, but can cut and sand large elongated surface areas commonly referred to as a slab. The slab or cutting surface may be an elongated board with or without a raw or live edge. The lengths of the elongated cutting surface may be approximately 10 feet. Using a blade 27, a cutterhead 23, and a sanding drum 9 where a substantial surface area of the cutting tool is brought into contact for machining and working the work piece. In particular, where a cutterhead 23 and sanding drum 9 are brought to cut and sand respectfully, on the work piece by way of the type of cutting in the disclosure, the alignment via angle and pitch of the cutting surface of the cutterhead 23 and sanding drum 9 with the work piece is important in establishing efficient and effective cutting operations on the work piece. An improper alignment reduces the quality and efficiency of cutting the work piece by adding angled offsets and miss-cuts. Therefore, when a large surfacing machine is brought across the surface of a work piece a high degree of cutting efficiency is required to maintain the accuracy of the cut.

Figure 1:
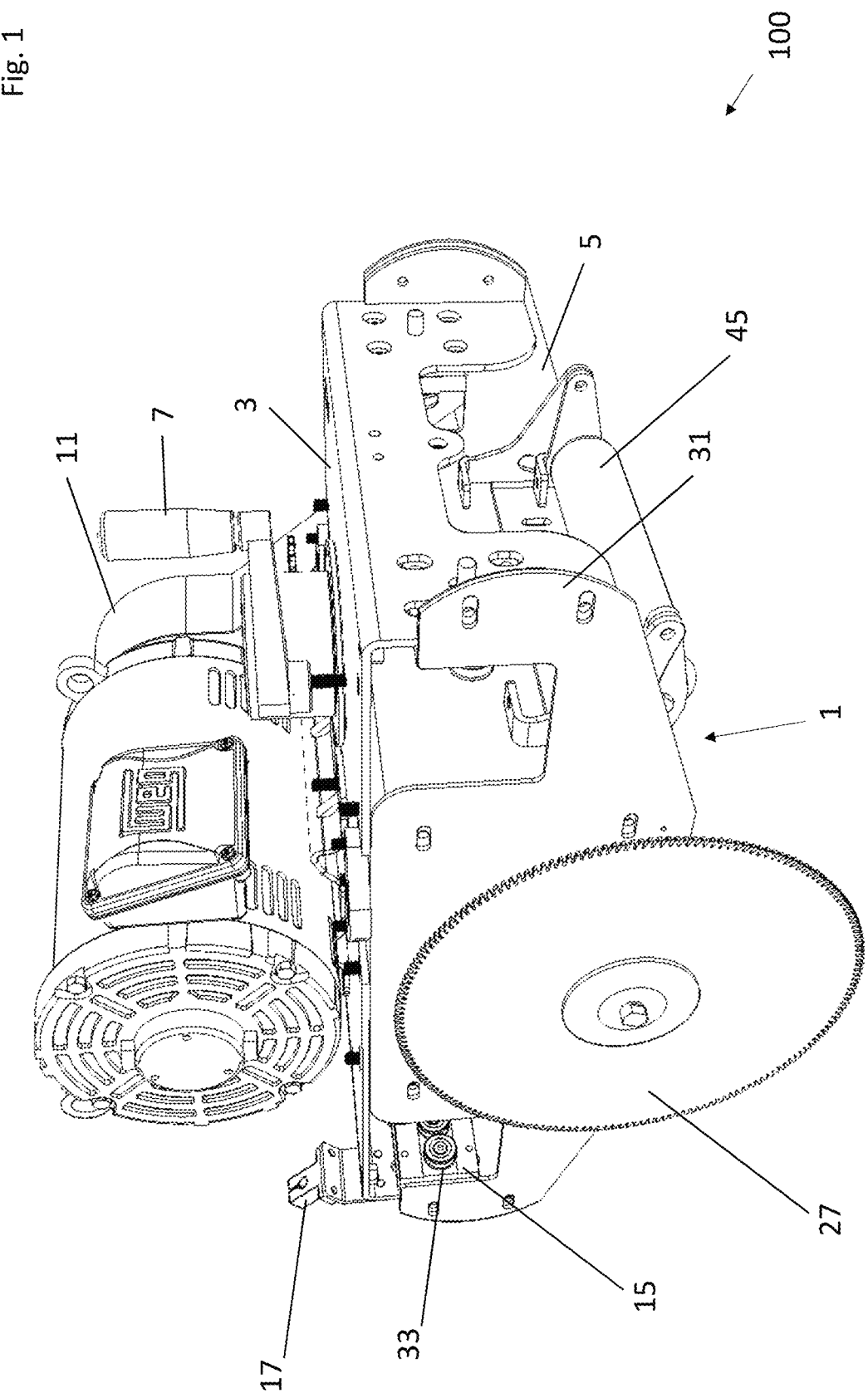
FIG. 1 is a perspective view of the flattening and resurfacing mill according to one example of the present disclosure.
Figure 2:
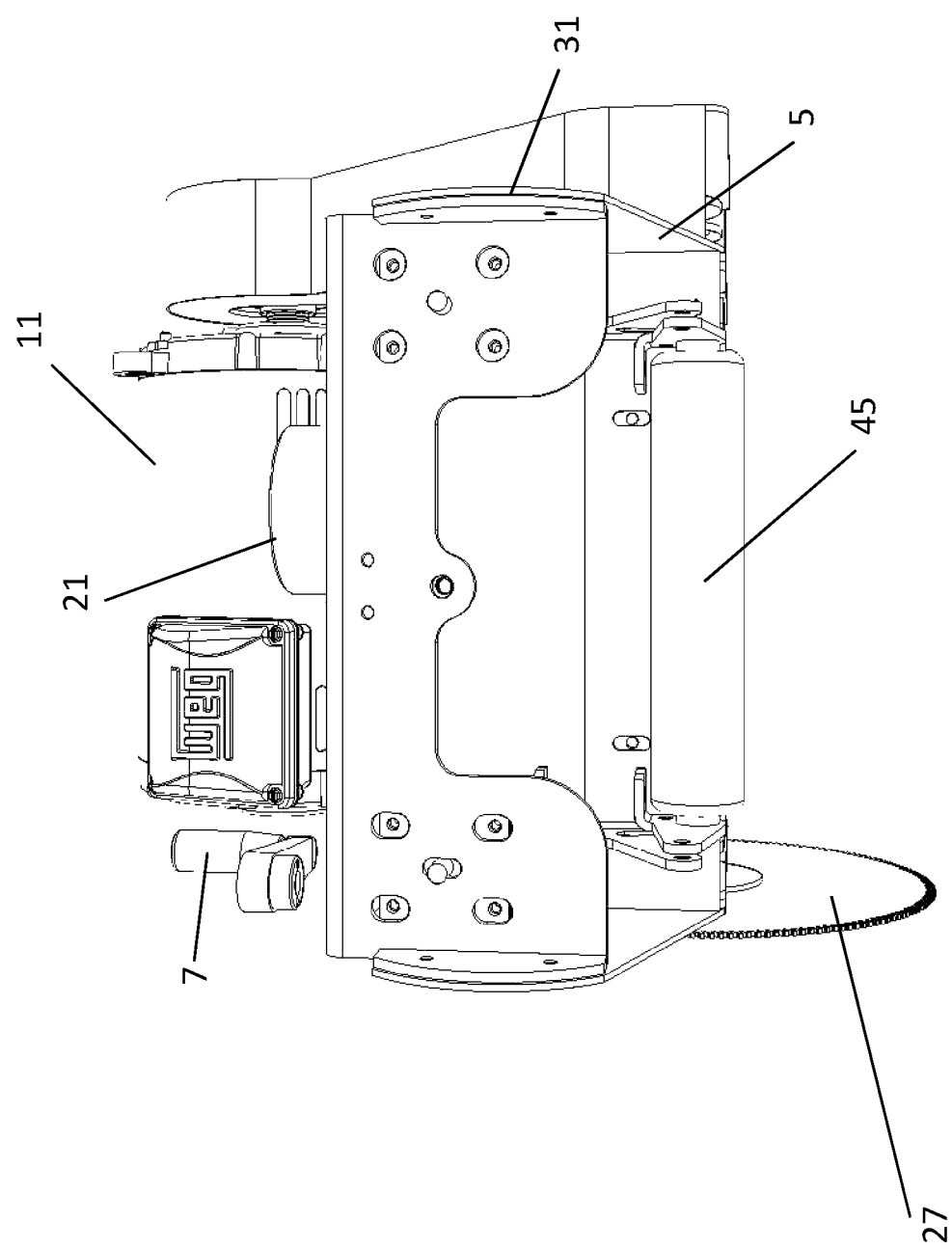
FIG. 2 is side view of the flattening and resurfacing mill according to one example of the present disclosure.
Figure 3:
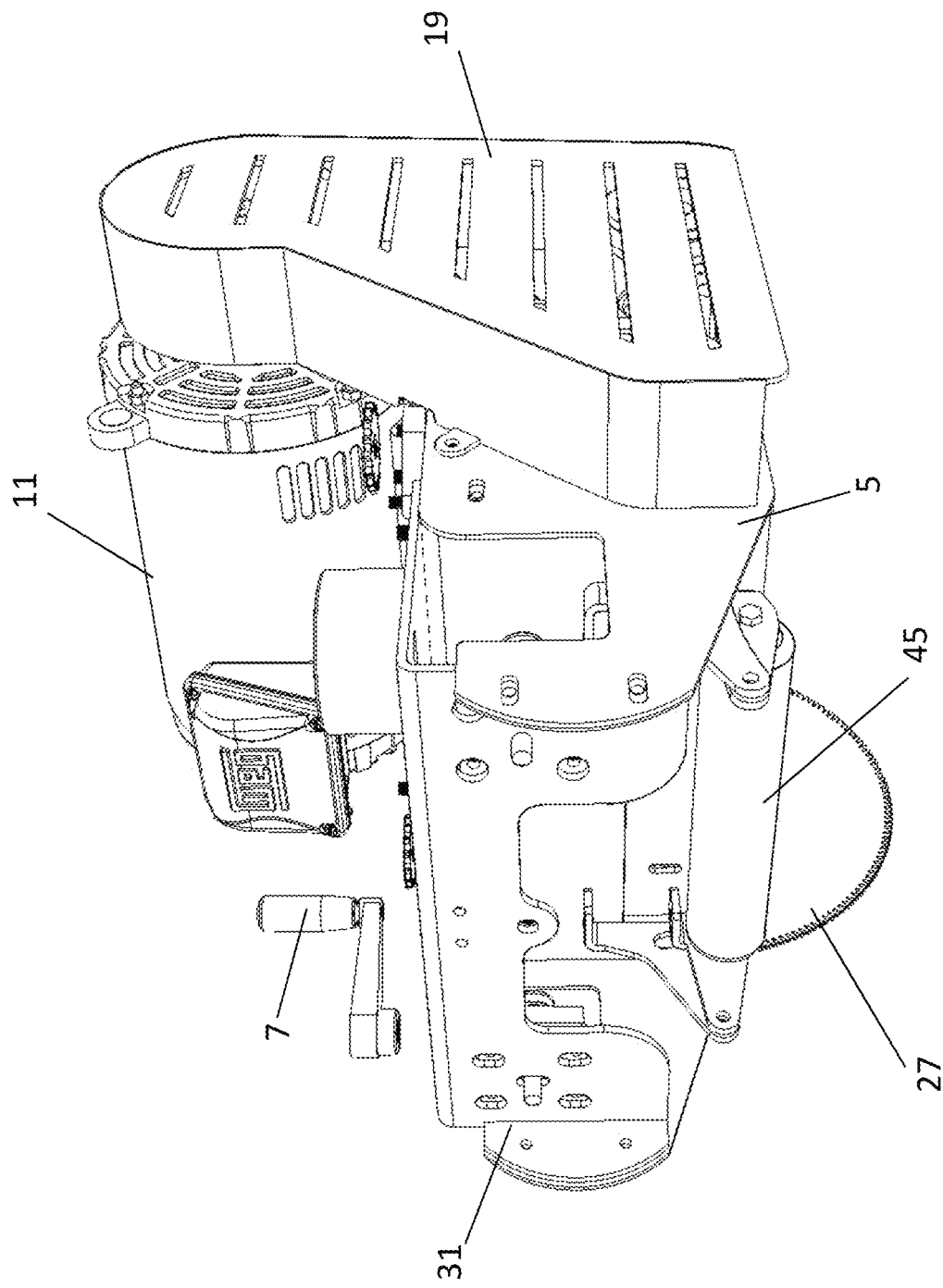
FIG. 3 is an additional perspective view of the flattening and resurfacing mill.

FIGS. 1-3 display the flattening and resurfacing mill 100. The flattening and resurfacing mill 100 includes a base 1 with a top surface 3 and bottom section 5. The bottom section is configured to allow for placement and attachment of shafts and to withstand the rotational forces that are typical of a commercial cutting device. The top surface 3 has a removably fixed attachment guide 17. The attachment guide 17 is configured to slidably and adjustably fix to a guide rail. The attachment guide 17 may be circular, rectangular, or any geometric shape to fit a guide rail. The attachment guide 17 may be removably fixed to any edge of the top surface 3 or to the plane of the top surface 3.

In one embodiment, the top surface 3 extends past the base 1. The bottom section 5 may include arm sections 31 which attach the bottom section 5 to the top surface 3. The arm sections 31 may add additional support to the top surface 3. The arm sections 31 may be configured to allow for a rail attachment means. The arm sections 31 may be configured to allow for a rail to slidably connect and slidably move along the rail using rollers 33.

A motor 11 or similar rotating means is attached to the top surface 3. The motor 11 or similar rotating means is configured to rotate a shaft 35 of the motor 11 at variable or fixed speeds common of a saw or cutting means. The shaft of the motor 11 may extend past an edge of the top surface 3 to allow for additional attachments.

Figure 6:
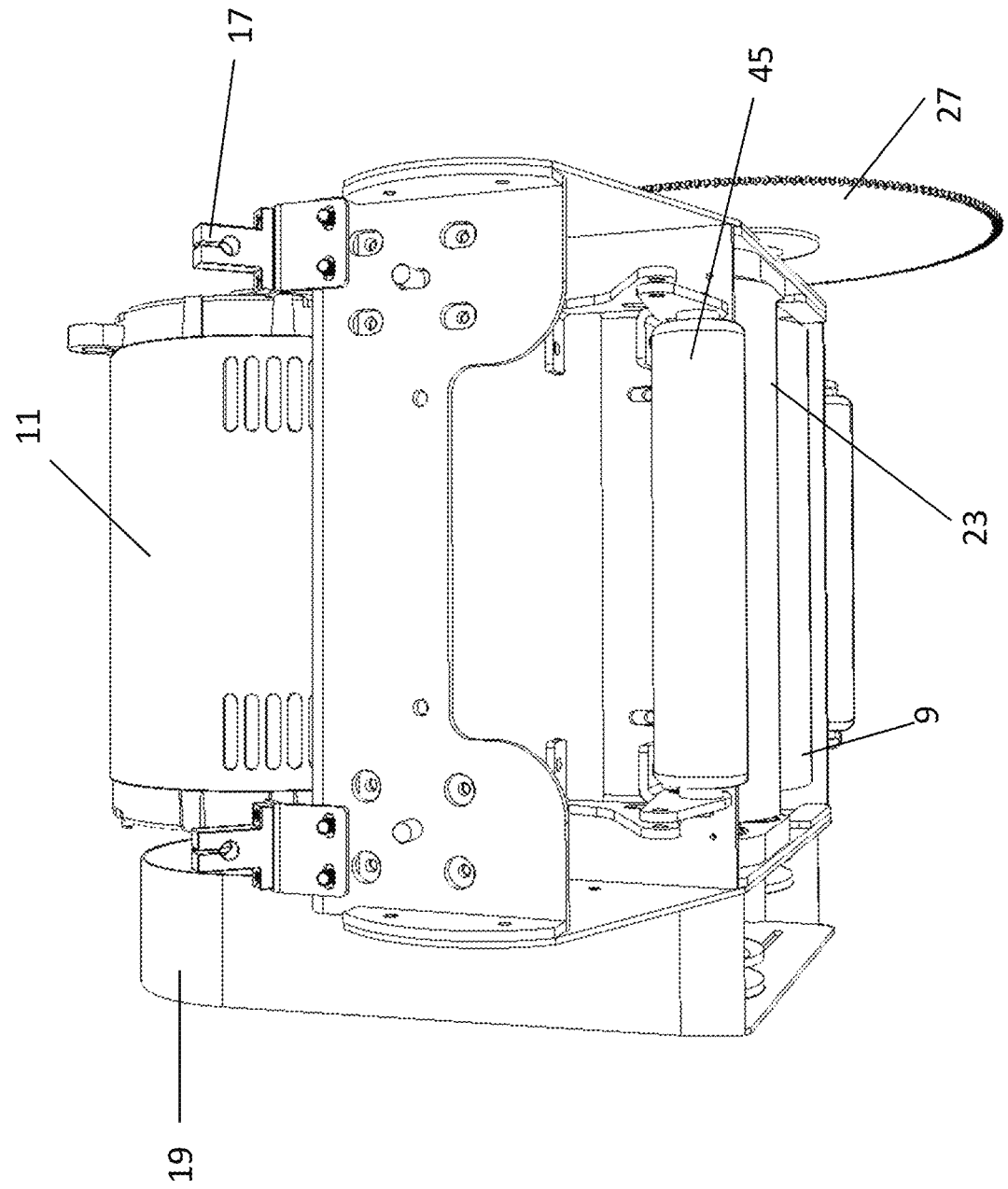
FIG. 6 is a back side view of one embodiment of the flattening and resurfacing mill.

A dust collection hookup 21 is partially centered on the surface 3 and connects to the sanding drum 9, seen in FIG. 6 to allow the flow of saw dust and debris created by the cutterhead 23 or sanding drum 9 cutting or sanding the work piece, respectfully, to flow away from the work piece or user. Transporting dust and debris from the work piece aids in an increase in accuracy to the desired outcome of the cut or sanding of the work piece. The dust collection hookup 21 is compatible and connectable to a hose, pipe, or tube to collect debris.

It is preferred in some non-limiting embodiments or aspects that a blade 27 is removably attached to the flattening and resurfacing mill 100.

Figure 4:
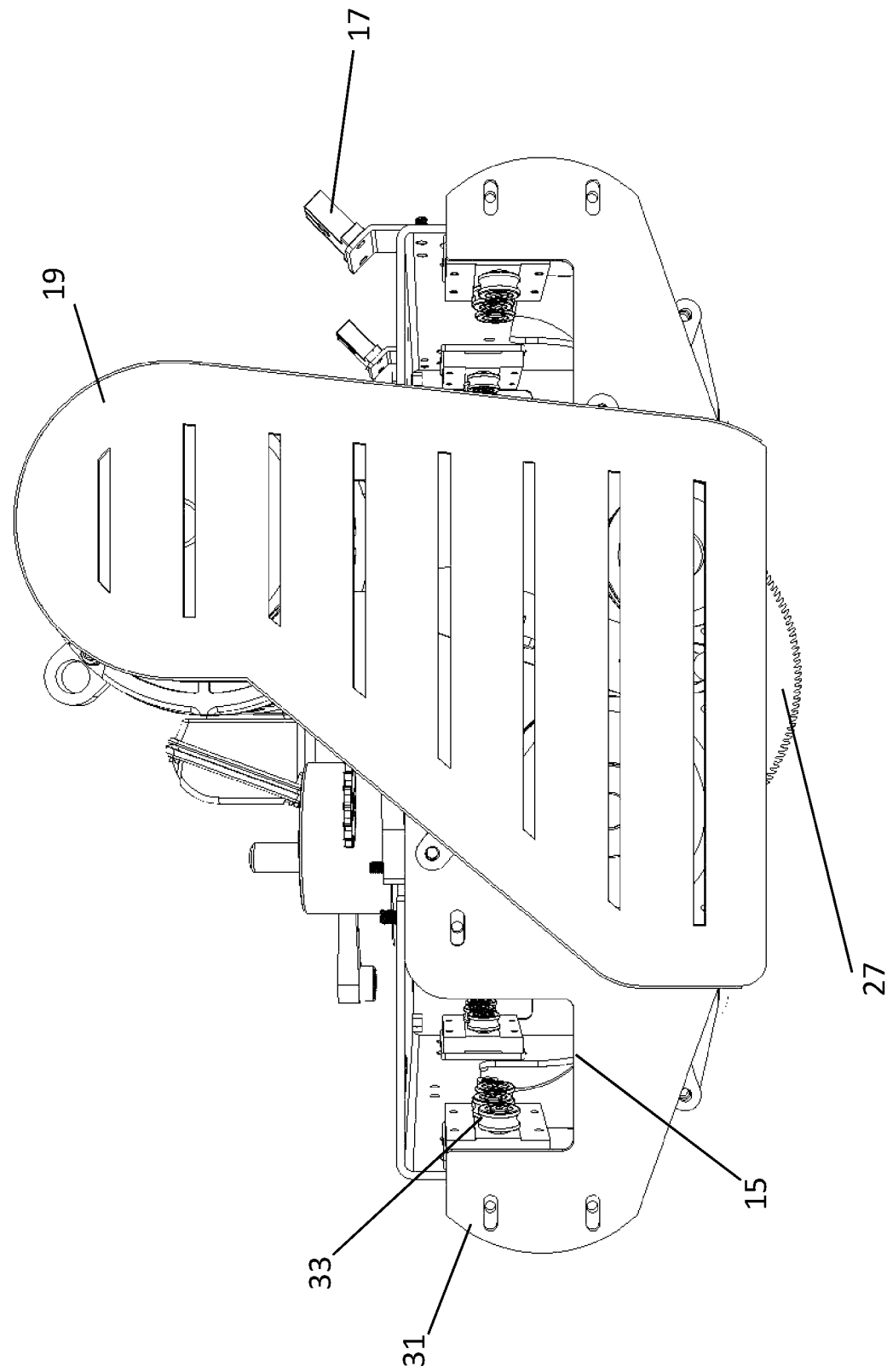
FIG. 4 is a drive side view of the flattening and resurfacing mill.
Figure 5:
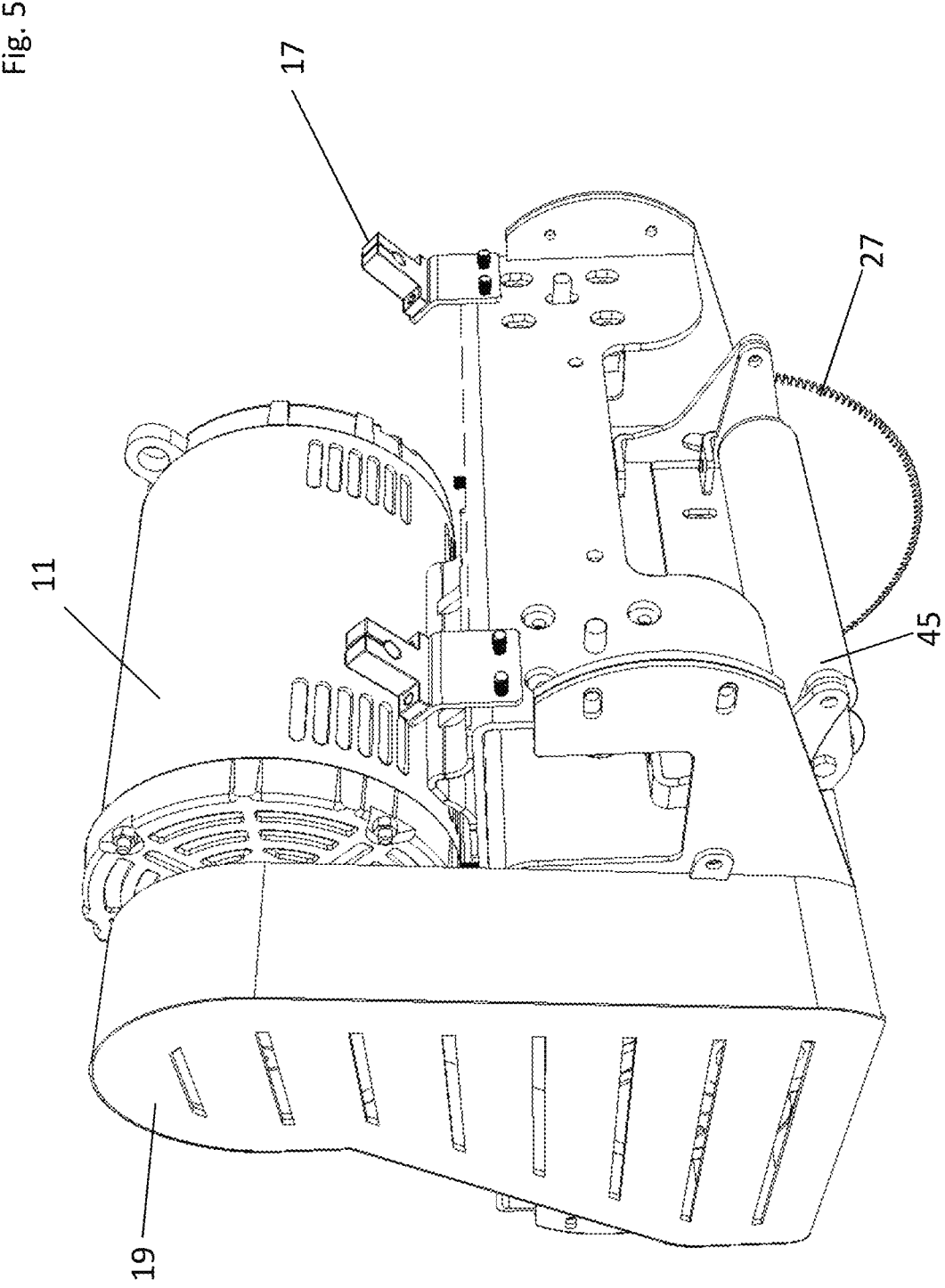
FIG. 5 is a drive side perspective view of the flattening and resurfacing mill.

FIGS. 3-5 display a drive side perspective view of the flattening and resurfacing mill 100. As displayed, the motor 11 is rotatably attached to a cutterhead 23 via a cutterhead shaft 37 extending through the bottom section 5 with at least one band 13*a*, 13*b*. A cover 19 covers the band 13*a*, 13*b* to provide protection from cutting debris as well as provide safety to the flattening and resurfacing mill user. The cover 19 may be removably attached to the base 1. The cutterhead 23 has a cutting tool, internal to the cutterhead 23, coupled to the cutterhead shaft 37 which is configured to rotationally cut when the flattening and resurfacing mill 100 is operating. The cutterhead 23 and cutting tool are aligned and angled so that the cut is even and level along the cutting surface. A plane is created by the top surface 3 of the base 1. The cutting surface, the top surface 3 of the base 1, and the cutterhead shaft 37 are all parallel to the plane of the top surface 3. The cutterhead 23 is configured to rotate so that the cutting edge and cutting direction are perpendicular to the plane of the top surface 3 and cut in a downward direction towards the cutting surface. This advantage allows for an increased cutting surface area, a reduction in tear out of the cutting surface, a more accurate cut, and an increase in duration efficiency. The cutting direction may additionally cut with the grain of the cutting surface.

At least one adjuster 7 configured for adjusting the pitch or angle of the top surface 3 of the base 1 relative to the cutting surface or rail system is removably and adjustably fixed to the top surface 3. The adjuster 39 may be fixed to the edge of the top surface 3 or to a centered portion of the top surface 3. The adjuster 39 may have a rotating means such as but not limited to gears. Each adjuster 39 may be individually adjustable to lower or raise the top surface 3 as it rests on a rail to align the cutterhead 23 as desired with the cutting surface.

The top surface 3 may attach to a rail or rail system via a rail attachment fixture 15 (Hookups). The rail attachment fixtures 15 may be along the edge of the top surface 3, the middle portion of the top surface 3, or along the bottom section 5. The rail attachment means may be, but are not limited to, a series of bolt holes, fasteners, plates, or extending bolts. The rail attachment fixtures 15 may be a cut out section of the bottom section 5 to allow for a rail to pass through.

The motor 11 may be additional rotatably attached to a sanding drum 9 (FIG. 3) with at least one band 13*a*, 13*b*. The sanding drum 9 sands the work piece to create a desired smoothness. The grit of the sanding drum 9 can be altered to adjust for a desired finished smoothness of the work piece. The adjuster 7 of the top surface 3 may also be used to adjust the height of sanding drum 9. The sanding drum 9 may have a sanding shaft 41 which rotatably and releasably fixes the sanding drum 9 to the bottom section 5. The sanding shaft 41 may be connected to the shaft of the motor 11 via at least one band 13*a*, 13*b* to transfer the rotational output of the motor 11 to the sanding drum 9. Sanding drum can be advantageously used simultaneously with the cutterhead 23 or separately.

FIG. 5 displays an additional perspective view. Hookups or rail attachment fixtures 15 are along the sides of the top surface 3, but may be located on any portion of the top surface 3, base 1, or bottom section 5. Hookups or rail attachment fixtures 15 may be are used for transporting the flattening and resurfacing mill 100 in regards to the work piece. The top surface 3 may include rail attachment fixtures or hookup 15 and the attachment guide or frame connector 17 for removably fixing the flattening and resurfacing mill 100 to a rail system 200.

Figure 7:
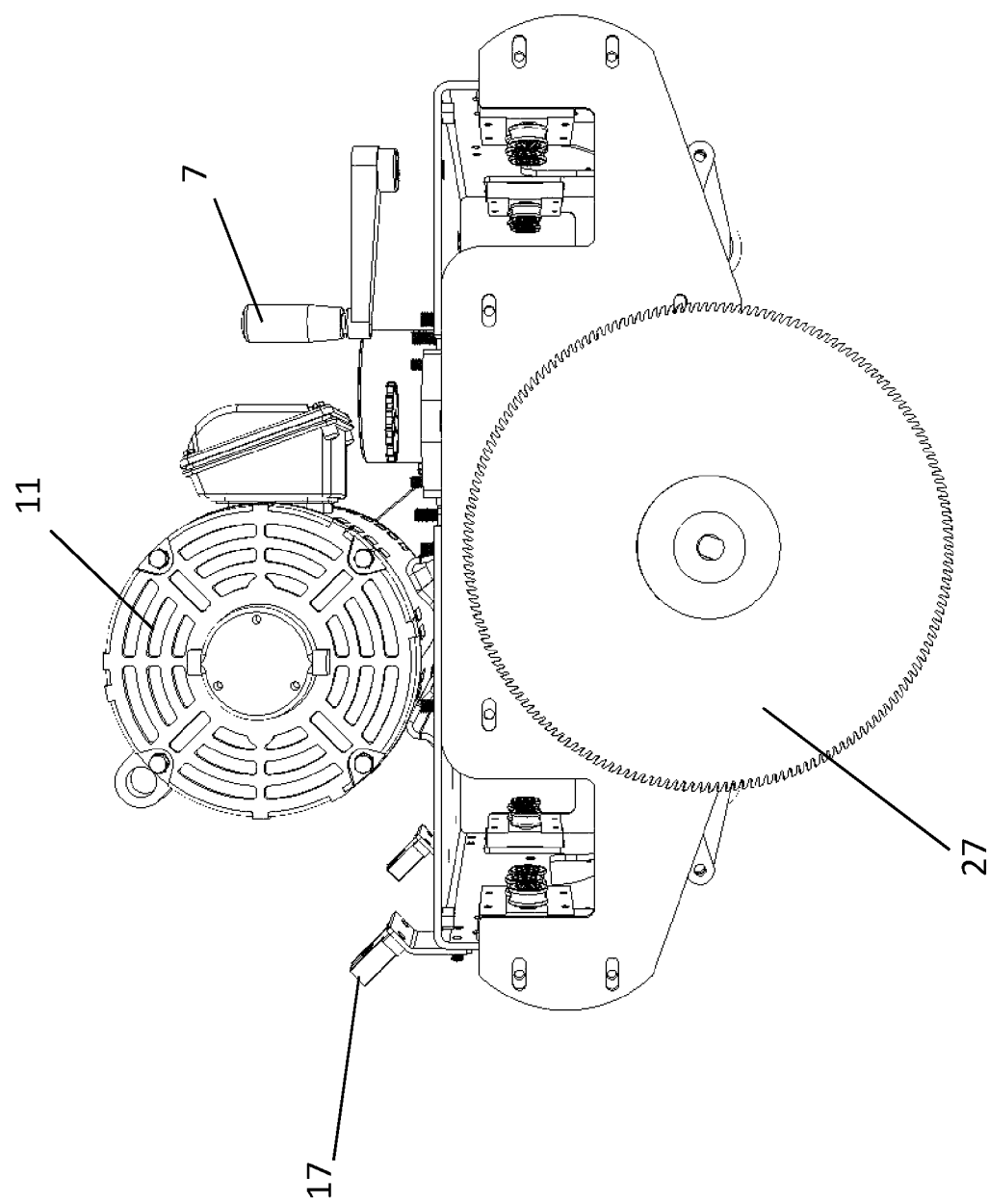
FIG. 7 is a side view of the flattening and resurfacing mill with a saw blade attachment.

FIG. 7 displays an additional side view including the blade 27 on one embodiment. Blade 27 may be used to cut or shape the workpiece, similarly to a table saw. Blade 27 may include a blade cover 29. Optional blade cover 29 is removably attached to the wall 5 of the base 1. The optional blade cover 29 protects the user from the blade 27 and debris from the work piece. The blade cover 29 may include a moveable or rotatable guard 43 which moves when contacted with the cutting surface. The rotatable guard 43 may be spring loaded to be in a closed position covering the blade 27 when not in contact with the cutting surface.

Figure 8:
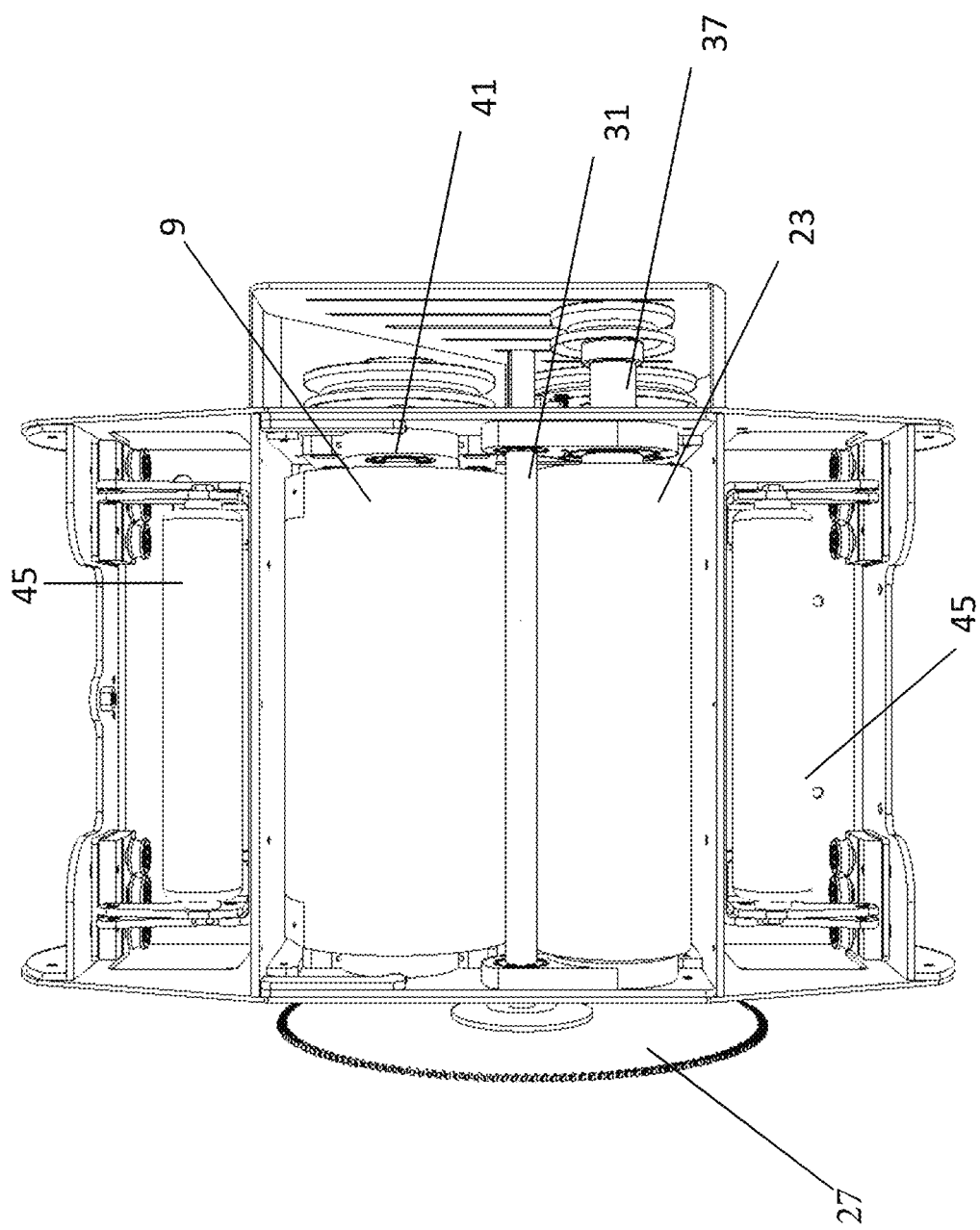
FIG. 8 is bottom view of the flattening and resurfacing mill with the saw blade attachment including a saw blade drive shaft.

FIG. 8 further displays the blade 27 and the blade drive shaft 30. The blade drive shaft 30 is removably attached to the blade 27 and to the motor 11. The motor 11 and blade drive shaft 30 are coupled by at least one band 13. The motor 11, when activated, rotates the band 13, which in turn rotates the blade drive shaft 30, rotating the blade 27. Tension rollers 45 are removably axially coupled to the bottom section 5. The tension rollers 45 may be coupled to the bottom section 5 with springs, dampeners, or any dampening means. The tension rollers 45 are approximately parallel with one of the shafts of the sanding drum 9, cutterhead 23, or blade drive shaft 30. The tension rollers 45 aid in movement of the flattening and resurfacing mill 100 by contacting the cutting surface. The height of the tension rollers 45 adjust in reference to the cutterhead 23 contacting the cutting surface.

Figure 9:
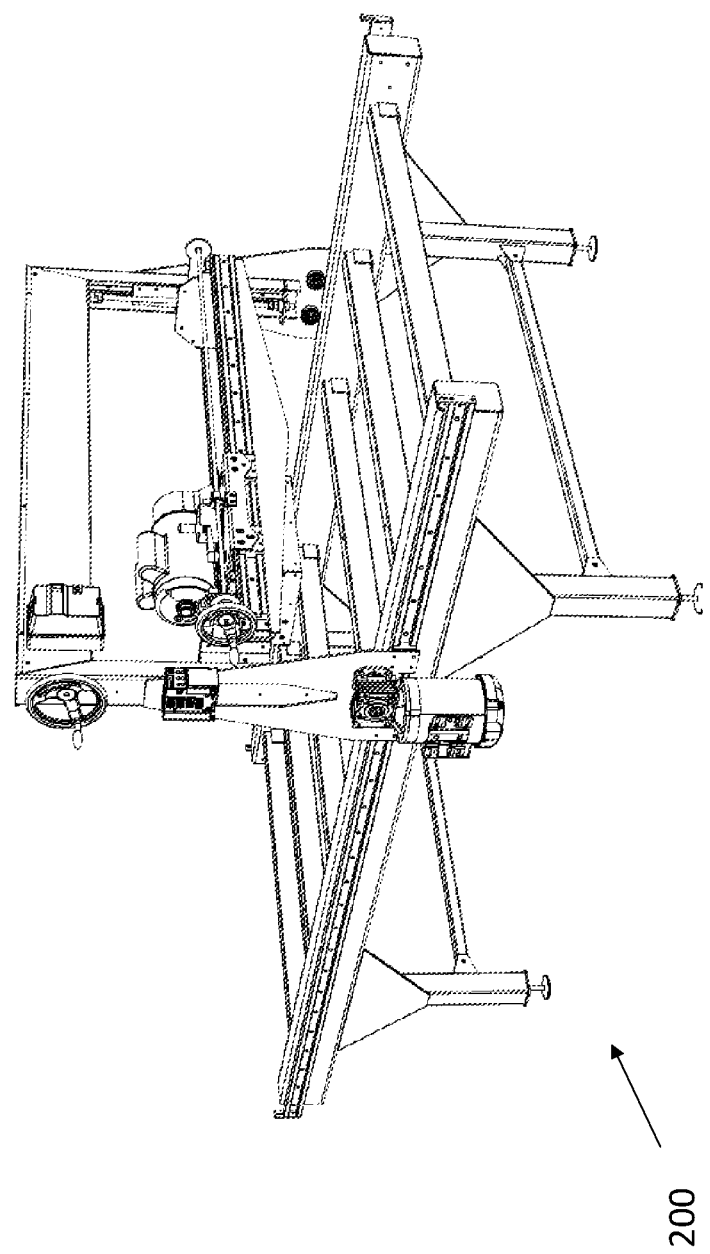
FIG. 9 is a top view of the flattening and resurfacing mill.
Figure 10:
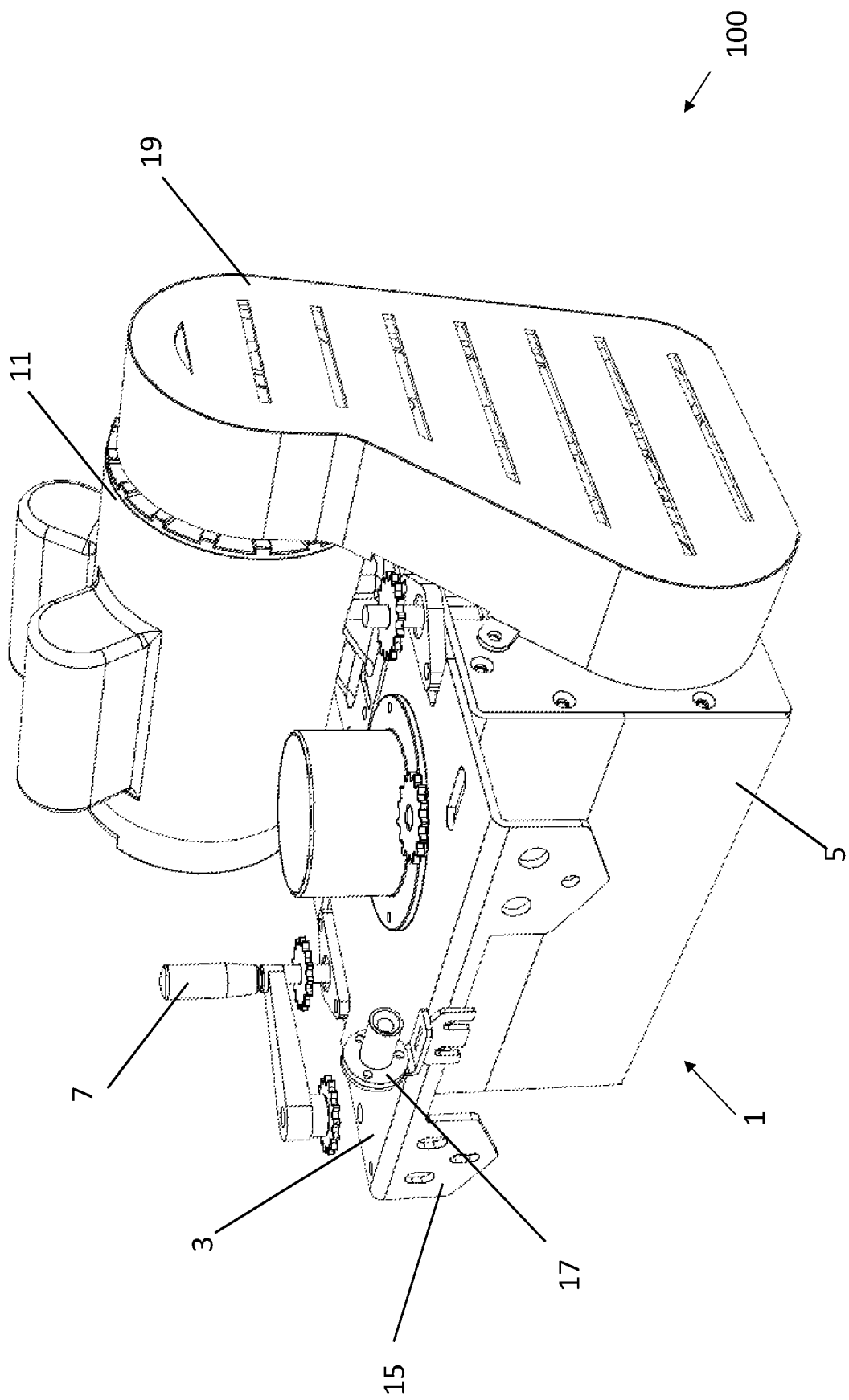
FIG. 10 is a perspective view of the flattening and resurfacing mill according to one example of the present disclosure.
Figure 11:
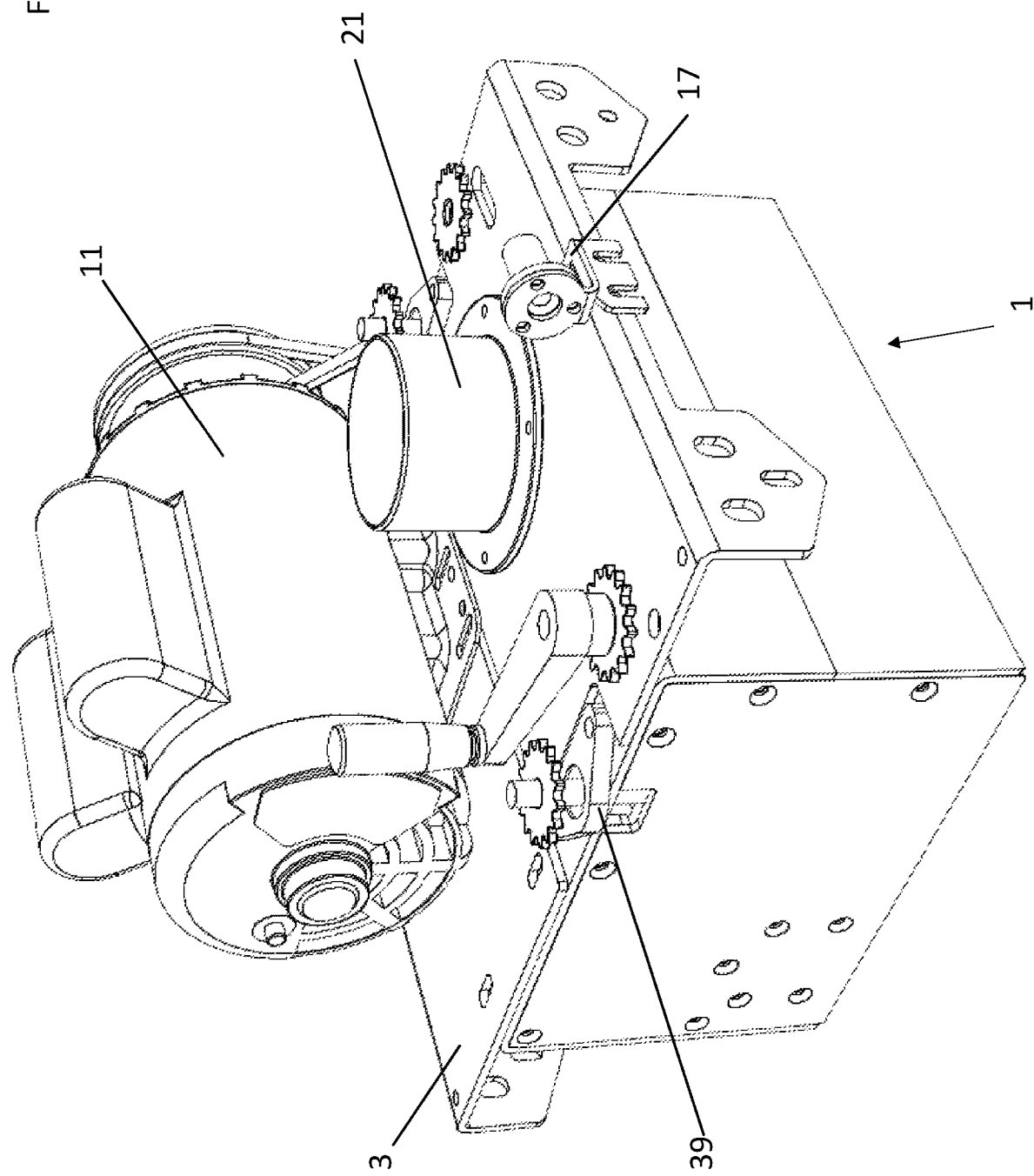
FIG. 11 is an additional perspective view of the flattening and resurfacing mill according to one example of the present disclosure.
Figure 12:
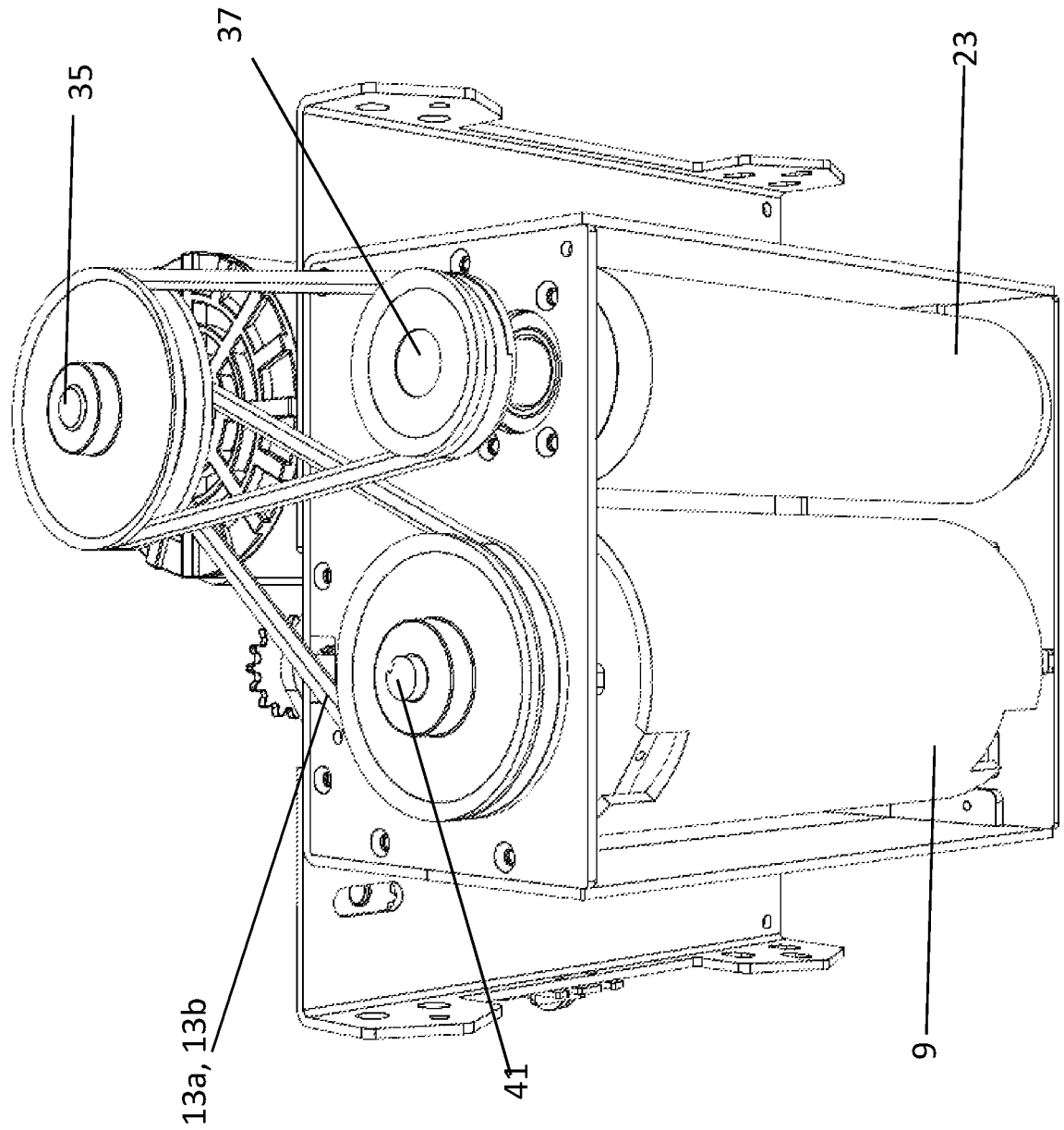
FIG. 12 is a bottom view of the flattening and resurfacing mill.
Figure 13:
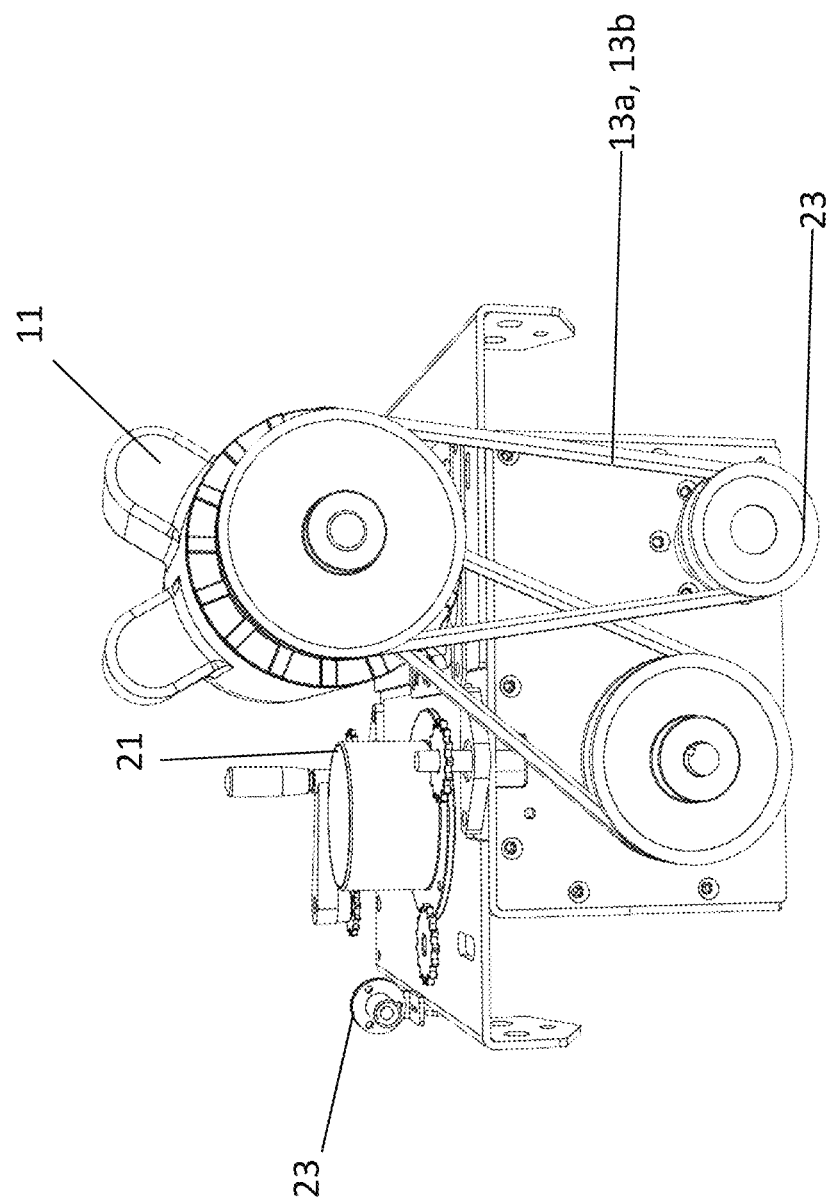
FIG. 13 is a drive side view of the flattening and resurfacing mill.
Figure 14:
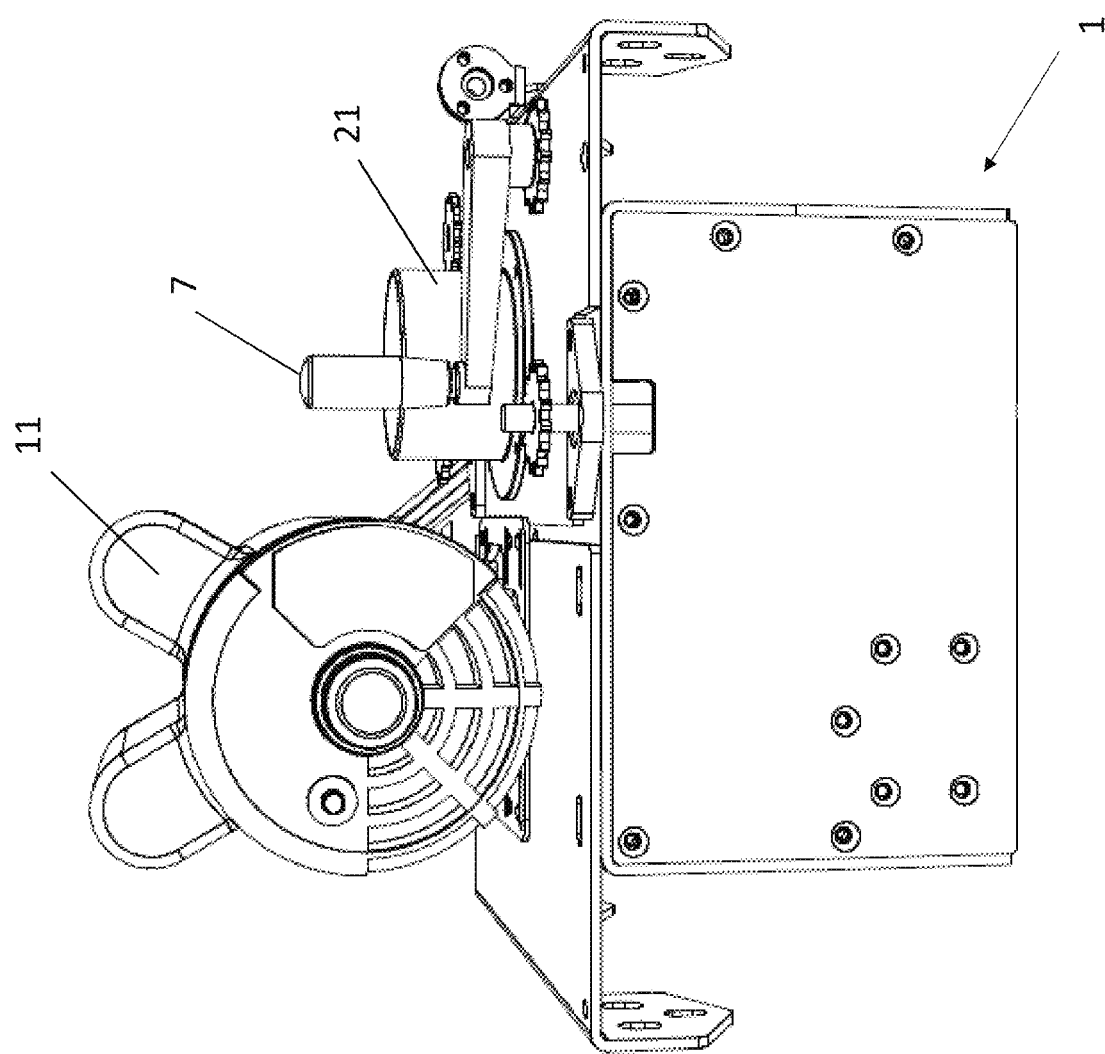
FIG. 14 is a side view of the flattening and resurfacing mill.
Figure 15:
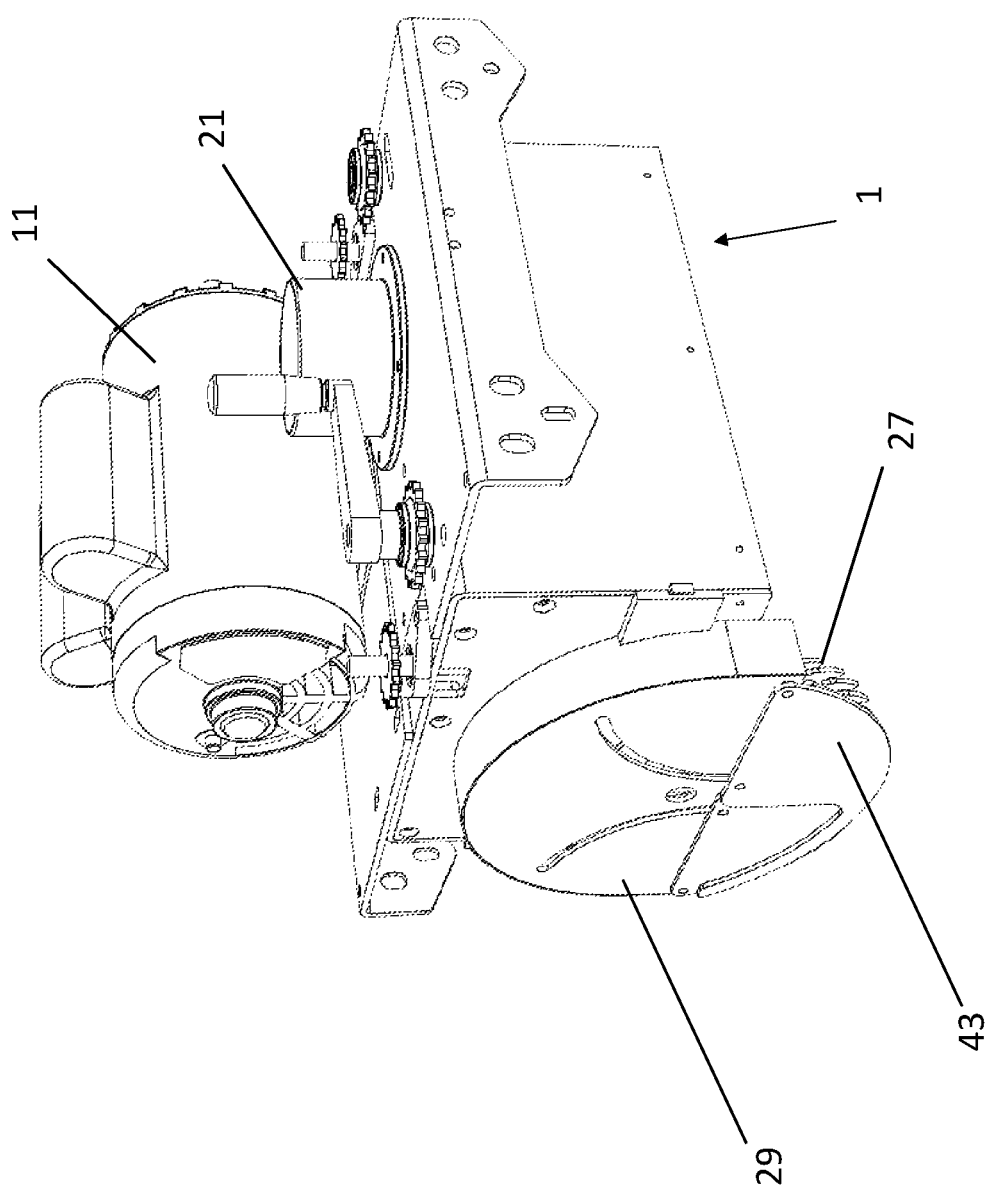
FIG. 15 is a side view of the flattening and resurfacing mill with a saw blade attachment.

FIG. 9 displays the flattening and resurfacing mill 100 on one embodiment of a rail system 200. The flattening and resurfacing mill 100 travels along the elongated surface of the work piece while connected to the rail system 200. The rail system 200 may direct the flattening and resurfacing mill 100 over the work piece. The rail system 200 may determine the depth of the cut the flattening and resurfacing mill 100 conducts, but the flattening and resurfacing mill 100 may also be adjusted to determine, for example but not limited to, pitch, angle, depth, speed, and duration of the cut in addition to sanding. The rail system may be 10 feet in length, but extensions may extend the mill by 5 to 10 feet.

The rail system 200 additionally provides the desired height at which the work piece is cut. The flattening and resurfacing mill 100 may move along a rail of the rail system 200 down the elongated surface of the work piece. The rail attachment fixtures 15 removably fix the flattening and resurfacing mill 100 to the rail system 200. The rail system 200 may be configured so that a tray for holding the elongated cutting surface is below the flattening and resurfacing mill 100 attached to a rail. At least one vertical beam connects the flattening and resurfacing mill 100 attached to a rail to the tray for holding the elongated cutting surface. Preferably, the at least one vertical beam is able to move in a horizontal position and the rail which the flattening and resurfacing mill 100 is attached to may move in a vertical direction. This allows for the adjustment and movement path for the flattening and resurfacing mill 100 to travel over the elongated cutting surface. The crank arm or adjuster 7 may be used to laterally adjust the flattening and resurfacing mill 100. An electronic system, a hydraulic system, or any similar system may be used to ease the user in the adjustment of the flattening and resurfacing mill 100. A user may use the crank arm 7 to laterally adjust the flattening and resurfacing mill 100 along the plane of the cutting surface. This advantageously allows the user to cut more of the cutting surface at a faster rate than a traditional router elongated cutting surface method. The sander 9 may also be used in a like matter.

FIGS. 10-15 display an alternative embodiment of the flattening and resurfacing mill 100. The flattening and resurfacing mill 100 includes a base 1 with a top surface 3 and bottom section 5. The bottom section is configured to allow for placement and attachment of shafts and to withstand the rotational forces that are typical of a commercial cutting device. The top surface 3 has a removably fixed attachment guide 17. The attachment guide 17 is configured to slidably and adjustably fix to a guide rail. The attachment guide 17 may be circular, rectangular, or any geometric shape to fit a guide rail. The attachment guide 17 may be removably fixed to any edge of the top surface 3 or to the plane of the top surface 3.

While aspects of a flattening and resurfacing mill are shown in the accompanying figures and described hereinabove in detail, other aspects will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A powered cutting apparatus for cutting an elongated work piece, the cutting apparatus comprising:
   a base having a top surface being approximately flat and fixed to a bottom section of the base comprising walls configured to withstand rotational force, the walls forming an internal cavity;
   at least one attachment guide removably fixed to the top surface for connecting to a guide rail and at least one rail attachment fixture along an edge of the top surface;
   a motor fixed to the base at the top surface; the motor comprises a shaft which extends past an edge of the top surface;
   a cutterhead coupled to the motor with a first band and fixed at least partially within the internal cavity of the bottom section of the base; and
   a first adjuster having gears for adjusting a pitch or angle of the top surface of the base relative to a cutting surface of the elongated workpiece, wherein the first adjuster is directly fixed to the top surface of the base, and
   wherein the cutterhead cuts an even plane surface of the cutting surface based on the rotational output of the motor.

2. The powered cutting apparatus for cutting an elongated work piece of claim 1, wherein the cutterhead comprises a cutter shaft coupled to the first band through the bottom section and a cutting tool coupled to the cutter shaft; wherein the top surface creates a plane parallel to the cutter shaft and the cutting tool cuts the elongated workpiece at an angle approximately perpendicular to the plane.

3. The powered cutting apparatus for cutting an elongated work piece of claim 1, further comprising a second adjuster for adjusting the pitch or the angle of the top surface of the base relative to the cutting surface, wherein the second adjuster is fixed to the top surface of the base.

4. The powered cutting apparatus for cutting an elongated work piece of claim 1, wherein the at least one rail attachment fixture fixes the top surface to a rail system.

5. The powered cutting apparatus for cutting an elongated work piece of claim 1, further comprising a sander coupled to the motor with a second band and adjustably fixed to the bottom section of the base; wherein a location of the sander relative to the cutterhead and a plane of the top surface is adjustable and the attachment guide is adjustably fixable to the guide rail.

6. The powered cutting apparatus for cutting an elongated work piece of claim 5, wherein the first band is releasably coupled to a shaft of the cutterhead and the second band is releasably coupled to a shaft of the sander so that an output of the motor can rotate the cutterhead and the sander at different rotational speeds.

7. A powered cutting apparatus for cutting an elongated work piece, the cutting apparatus comprising:
   a base having a bottom section with an internal cavity and a top surface with drop down attachments configured for releasably coupling to a rail and at least one guide attachment for releasably coupling to a guide rail;

a motor fixed to the top surface of the base;

a cutterhead coupled to a shaft of the motor with a first band and rotatably fixed to the bottom section of the base via a shaft, the cutterhead is positioned approximately parallel with the top surface of the base and fixed at least partially within the internal cavity of the bottom section of the base; and a sander coupled to the shaft of the motor with a second band, the second band directly connected to the shaft of the motor, and adjustably fixed to the bottom section of the base and fixed at least partially within the internal cavity of the bottom section of the base; wherein a sander location relative to the cutterhead is adjustable and the at least one guide attachment is adjustably fixable to the guide rail;

wherein the sander is a sanding drum and the sander location relative to the cutterhead and the guide rail is adjustable with a first adjuster having gears for adjusting a pitch or angle of the top surface of the base relative to a cutting surface of the elongated workpiece, wherein the first adjuster is directly fixed to the top surface of the base.

8. The powered cutting apparatus for cutting an elongated work piece of claim 7, further comprising a crank arm rotationally fixed to the top surface and configured to laterally adjust the base in reference to the guide rail.

9. The powered cutting apparatus for cutting an elongated work piece of claim 7, wherein the cutterhead comprises a removable and adjustable shaft coupled to the first band through the cavity and a cutting tool coupled to the shaft; wherein a cutting surface angle of the cutting tool is parallel to the shaft and adjustable based on an adjustability of the shaft.

10. The powered cutting apparatus for cutting an elongated work piece of claim 7, further comprising a second adjuster for adjusting the pitch or angle of the base relative to a cutting surface, wherein the second adjuster is adjustably fixed to the base.

11. The powered cutting apparatus for cutting an elongated work piece of claim 7, wherein the drop down attachments comprise at least one fixture means which allow for adjustably attaching the top surface to the rail.

12. The powered cutting apparatus for cutting an elongated work piece of claim 7, further comprising a dust collection port in fluid communication with the cutterhead and the sander through the top surface of the base.

13. The powered cutting apparatus for cutting an elongated work piece of claim 7, wherein the first band is releasably coupled to the cutterhead and the motor and the second band is releasably coupled to the motor so that an output of the motor can rotate the cutterhead and the sander at different rotational speeds.

14. The powered cutting apparatus for cutting an elongated work piece of claim 7, further comprising a blade attachment removably and rotationally fixed to the bottom section of the base with a blade shaft and at least one tension roller rotatably coupled to the base; wherein the blade attachment is configured to cut the elongated work piece at a cutting surface angle parallel to the blade shaft rotating in a rotational downward motion towards the elongated work piece and adjustable based on an adjustability of the blade shaft and the at least one tension roller contacts the cutting surface of the elongated workpiece.

15. A method of cutting an elongated workpiece with a powered cutting apparatus comprising:

releasably attaching the powered cutting apparatus to a rail system with at least one attachment guide removably fixed to the top surface for connecting to a guide rail and at least one rail attachment fixture along an edge of the top surface;

releasably attaching the elongated workpiece to the rail system;

adjusting the elongated workpiece to be flush or level along a plane of the rail system;

adjusting a cutterhead of the powered cutting apparatus to cut along a plane of the elongated workpiece, the cutterhead being at least partially internal to a lower section of the cutting apparatus and an adjuster having gears for adjusting a pitch or angle of the top surface of the base relative to a cutting surface of the elongated workpiece, wherein the first adjuster is directly fixed to the top surface of the base;

cutting the elongated workpiece using the cutterhead by having the cutterhead cut downward towards the plane;

and moving the powered cutting apparatus to cut at least a part of the elongated workpiece.

16. The method of claim 15, further comprising adjusting a sander of the powered cutting apparatus to sand along the plane of the elongated workpiece wherein the sander is coupled to the shaft of the motor with a second band, the second band directly connected to the shaft of the motor, and adjustably fixed to the bottom section of the base and fixed at least partially within the internal cavity of the bottom section of the base; wherein a sander location relative to the cutterhead is adjustable and the at least one guide attachment is adjustably fixable to the guide rail.

17. The method of claim 15, further comprising sanding the elongated workpiece using a sander along the plane of the elongated workpiece; and rotating the cutterhead and the sander at different rotational speeds wherein a first band is releasably coupled to the cutterhead and a motor and a second band is releasably coupled to the motor so that an output of the motor can rotate the cutterhead and the sander at the different rotational speeds.

* * * * *

UNITED STATES PATENT AND TRADEMARK OFFICE
CERTIFICATE OF CORRECTION

| | | |
|---|---|---|
| PATENT NO. | : 12,318,852 B2 | Page 1 of 1 |
| APPLICATION NO. | : 17/698610 | |
| DATED | : June 3, 2025 | |
| INVENTOR(S) | : Japheth Peight | |

It is certified that error appears in the above-identified patent and that said Letters Patent is hereby corrected as shown below:

In the Claims

Column 8, Line 27, Claim 1, delete "base; and" and insert -- base; --

Column 10, Line 29, Claim 15, delete "the first" and insert -- the --

Signed and Sealed this
Fourteenth Day of October, 2025

John A. Squires
*Director of the United States Patent and Trademark Office*